US010565574B2

(12) United States Patent
Powell

(10) Patent No.: US 10,565,574 B2
(45) Date of Patent: Feb. 18, 2020

(54) METHODS AND SYSTEMS FOR APPLYING PROMOTION CODES TO PAYMENT TRANSACTIONS

(71) Applicant: MASTERCARD INTERNATIONAL INCORPORATED, Purchase, NY (US)

(72) Inventor: Jonathan Robert Powell, Aliso Viejo, CA (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 0 days.

(21) Appl. No.: 16/173,982

(22) Filed: Oct. 29, 2018

(65) Prior Publication Data
US 2019/0066074 A1 Feb. 28, 2019

Related U.S. Application Data

(63) Continuation of application No. 11/966,724, filed on Dec. 28, 2007, now abandoned.

(51) Int. Cl.
*G06Q 30/02* (2012.01)
*G06Q 20/20* (2012.01)
(Continued)

(52) U.S. Cl.
CPC ............. *G06Q 20/20* (2013.01); *G06Q 20/02* (2013.01); *G06Q 20/387* (2013.01); *G06Q 30/02* (2013.01); *G06Q 30/0207* (2013.01)

(58) Field of Classification Search
CPC .................................................. G06Q 30/02
See application file for complete search history.

(56) References Cited

U.S. PATENT DOCUMENTS 6,049,778 A 4/2000 Walker et al.
6,594,640 B1 * 7/2003 Postrel .................. G06Q 20/06
705/14.27
(Continued)

FOREIGN PATENT DOCUMENTS

WO 2007092789 A3 7/2008

OTHER PUBLICATIONS

International Search Report of PCT/US2008/080482; dated Jan. 7, 2009; 13 pages.
(Continued)

*Primary Examiner* — Marilyn G Macasiano
(74) *Attorney, Agent, or Firm* — Armstrong Teasdale LLP

(57) ABSTRACT

A method for applying promotion codes to a payment transaction is provided. The method uses at least one input device in communication with a database. The payment transaction includes a purchase made by a cardholder using a payment card over a payment card network. The method includes storing promotion data within the database including at least one merchant participating in the payment card network, each promotional program offered by the at least one merchant to the cardholder, and promotion codes associated with each promotional program offered to the cardholder. The method further includes accessing the promotion data using the at least one input device, receiving a selected promotional program from the cardholder using the at least one input device, and automatically applying the promotion codes associated with the selected promotional program to the payment transaction.

20 Claims, 9 Drawing Sheets

(51) Int. Cl.
*G06Q 20/02* (2012.01)
*G06Q 20/38* (2012.01)

(56) References Cited

U.S. PATENT DOCUMENTS

| | | | |
|---|---|---|---|
| 6,671,358 | B1 | 12/2003 | Seidman et al. |
| 7,103,573 | B2 | 9/2006 | Mobed et al. |
| 7,308,254 | B1 | 12/2007 | Rissanen |
| 7,392,224 | B1 | 6/2008 | Bauer et al. |
| 7,934,639 | B1 * | 5/2011 | Chen ............ G06Q 20/20 235/375 |
| 2002/0133400 | A1 | 9/2002 | Terry et al. |
| 2004/0122736 | A1 * | 6/2004 | Strock ............ G06Q 30/02 705/14.31 |
| 2004/0238622 | A1 | 12/2004 | Freiberg |
| 2006/0053056 | A1 * | 3/2006 | Alspach-Goss ........ G06Q 20/10 705/14.17 |
| 2006/0259364 | A1 | 11/2006 | Strock |
| 2007/0038515 | A1 | 2/2007 | Postrel |
| 2007/0100691 | A1 * | 5/2007 | Patterson ............ G06Q 20/40 705/14.14 |
| 2007/0150411 | A1 | 6/2007 | Addepalli et al. |
| 2007/0174120 | A1 | 7/2007 | Asmar et al. |
| 2007/0267479 | A1 | 11/2007 | Nix et al. |
| 2008/0005018 | A1 | 1/2008 | Powell |
| 2008/0120155 | A1 * | 5/2008 | Pliha ............ G06Q 20/10 705/14.17 |

OTHER PUBLICATIONS

PCT/US2008/080482 Preliminary Report on Patentability dated Jul. 8, 2010, 12 pages.
PCT/US2008/080427 Preliminary Report on Patentability dated Jul. 8, 2010, 9 pages.
PCT/US2008/080427 Written Opinion of International Searching Authority dated Dec. 10, 2008, 9 pages.
PCT/US2008/080427 International Search Report dated Dec. 10, 2008, 3 pages.
U.S. Appl. No. 11/966,803 Office Action dated Nov. 17, 2010, 30 pages.

* cited by examiner

US 10,565,574 B2

METHODS AND SYSTEMS FOR APPLYING PROMOTION CODES TO PAYMENT TRANSACTIONS

CROSS REFERENCE TO RELATED APPLICATIONS

This application is a continuation application of U.S. patent application Ser. No. 11/966,724, filed Dec. 28, 2007, entitled "METHODS AND SYSTEMS FOR APPLYING PROMOTION CODES TO PAYMENT TRANSACTIONS", the disclosure of which is incorporated herein by reference in its entirety.

BACKGROUND OF THE INVENTION

This invention relates generally to applying promotion codes to payment transactions and, more particularly, to network-based methods and systems for applying promotion codes initiated by an account holder to payment transactions conducted over a bankcard network.

Historically, the use of "charge" cards for consumer transaction payments was at most regional and based on relationships between local credit issuing banks and various local merchants. The payment card industry has since evolved with the issuing banks forming associations (e.g., MasterCard) and involving third party transaction processing companies (e.g., "Merchant Acquirers") to enable cardholders to widely use charge cards at any merchant's establishment, regardless of the merchant's banking relationship with the card issuer.

For example, FIG. 1 of the present application shows an exemplary multi-party payment card industry system for enabling payment-by-card transactions in which the merchants and issuer do not need to have a one-to-one special relationship. Yet, various scenarios exist in the payment-by-card industry today, where the card issuer has a special or customized relationship with a specific merchant, or group of merchants. These special or customized relationships may, for example, include private label programs, co-brand programs, proprietary card brands, rewards programs, and others. The special or customized issuer-merchant relationships often require direct communications between the parties for transaction authorization and/or clearing (e.g., for financial transactions). Further, the issuer may be required to maintain back office processes to manage the financial aspects of these special or customized relationships. Alternatively, the issuers may exploit communications through Merchant Acquirers to facilitate indirect communications with the merchants.

Consideration is now being given to ways of improving implementations of the special or customized issuer-merchant relationships in the payment-by-card industry. In particular, attention is being directed to utilizing legacy general purpose bankcard infrastructure to support the transaction routing, merchant accounting, and financial settlement for these special or individualized relationships.

At least some known special or customized issuer-merchant relationships include rewards programs or other special offers (e.g., financing) that are applied to purchases made by account holders or customers using a payment card over a bankcard network. Typically, in these cases, the issuer is required to track and apply rules representing the rewards programs or special offers to purchases made by an account holder. Consideration is now being given to ways to enable account holders to input promotion codes or business rules that are then applied to payment transactions using a payment card over a bankcard network, wherein the promotion codes or business rules inputted by the account holders are associated with a rewards program or a special offer being made by the merchant.

BRIEF DESCRIPTION OF THE INVENTION

In one aspect, a method for applying promotion codes to a payment transaction is provided. The method uses at least one input device in communication with a database. The payment transaction includes a purchase made by a cardholder using a payment card over a payment card network. The method includes storing promotion data within the database including at least one merchant participating in the payment card network, each promotional program offered by the at least one merchant to the cardholder, and promotion codes associated with each promotional program offered to the cardholder. The method further includes accessing the promotion data using the at least one input device, receiving a selected promotional program from the cardholder using the at least one input device, and automatically applying the promotion codes associated with the selected promotional program to the payment transaction.

In another aspect, a network-based system for applying promotion codes to a payment transaction is provided. The payment transaction includes a purchase made by a cardholder using a payment card over a payment card network. The system includes a client system, a database for storing information, and a server system configured to be coupled to the client system and the database. The server is configured to store promotional data within the database including at least one merchant participating in the payment card network, each promotional program offered by the at least one merchant to the cardholder, and promotion codes associated with each promotional program offered to the cardholder. The server is further configured to display the promotion data on the client system including each promotional program offered by the at least one merchant to the cardholder, receive selection data from the client system wherein the selection data represents the promotional program selected by the cardholder, and automatically apply the promotion codes associated with the selected promotional program to the payment transaction.

In another aspect, a computer coupled to a database for applying promotion codes to a payment transaction is provided. The payment transaction is performed by a cardholder using a payment card over a payment card network. The computer is in communication with an input device. The database stores promotional data including each merchant participating in the payment card network, each promotional program offered by each merchant to the cardholder, and promotion codes associated with each promotional program offered to the cardholder. The input device accesses the database and displays the promotion data including each promotional program offered by each merchant to the cardholder. The computer is programmed to receive selection data from the input device wherein the selection data represents the promotional program selected by the cardholder for application to a payment transaction initiated by the cardholder with the merchant offering the selected promotional program, and automatically apply the promotion codes associated with the selected promotional program to the payment transaction.

In another aspect, a computer program embodied on a computer readable medium for applying promotion codes to a payment transaction is provided. The payment transaction includes a purchase made by a cardholder using a payment card over a payment card network. The program includes at least one code segment that stores within a database promotion data including at least one merchant participating in the payment card network, each promotional program offered by the at least one merchant to the cardholder, and promotion codes associated with each promotional program offered to the cardholder. The program further includes at least one code segment that enables access to the promotion data using at least one input device, receives selection data from the at least one input device wherein the selection data represents a promotional program selected by the cardholder, and applies the promotion codes associated with the selected promotional program to the payment transaction initiated by the cardholder.

DETAILED DESCRIPTION OF THE INVENTION

Figure 1:
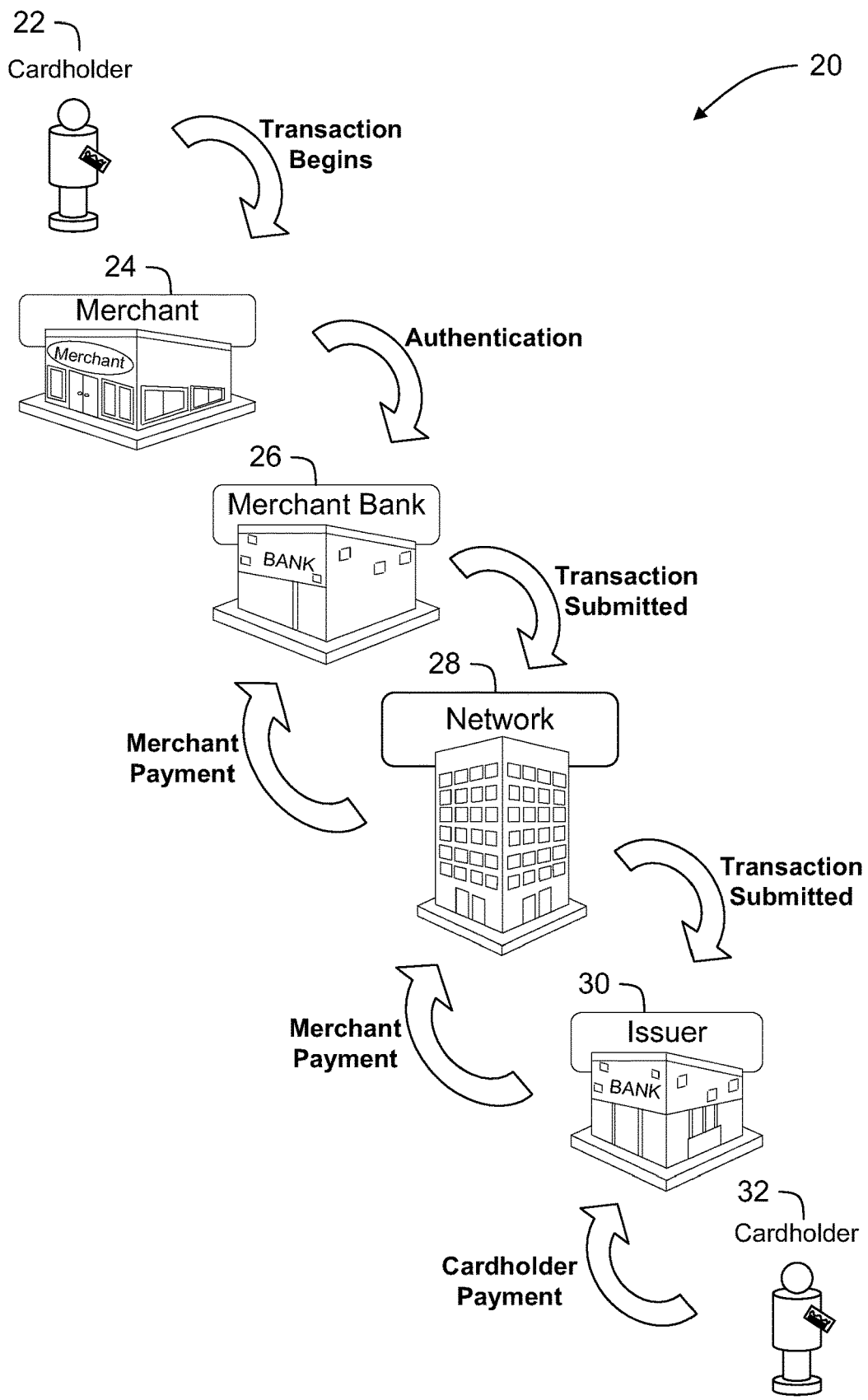
FIG. 1 is a schematic diagram illustrating an exemplary multi-party payment card industry system for enabling ordinary payment-by-card transactions in which the merchants and issuer do not need to have a one-to-one special relationship.

Described in detail herein are exemplary embodiments of systems and processes for implementing special or customized issuer-merchant relationships in the payment-by-card industry. The systems and processes include a cardholder that utilizes a payment card to make a purchase from a merchant, wherein the merchant has registered with a bankcard network such that the purchase made by the cardholder using the payment card can be processed over the bankcard network.

The systems and processes described herein facilitate enabling a cardholder to select a promotion offered by a merchant for enticing the cardholder to make a purchase from the merchant, and then apply promotion codes associated with the selected promotion to a purchase made by the cardholder from the merchant. A promotion or promotional program, as described herein, is typically a special offer made by a merchant to a cardholder, for example, 30 days same as cash, 90 days no interest, no payment due for 6 months, or a predetermined percentage (e.g., 10%) off the purchase price of the product or service, etc., to entice the cardholder to make a purchase from the merchant using the payment card.

More specifically, the systems and processes described herein facilitate, for example, electronic submission of information using a client system, automated extraction of information, and web-based reporting for internal and external system users. A technical effect of the systems and processes described herein include at least one of (a) storing promotion data in a promotion database for merchants participating in the bankcard network including a merchant name, a merchant identification (ID) number, promotion identifiers, transaction qualifications, terms of promotions and promotion codes; (b) registering the promotion data in a merchant accounting system, also known as a deferred payment tracking system; (c) transmitting the promotion data from the promotion database to a cardholder database including a displayable list of available promotions for each cardholder; (d) selecting by a cardholder at least one promotion from the list of available promotions, the selecting is performed by the cardholder using an input device such as a personal computer, a cellular telephone, a personal digital assistant (PDA), or other web-based connectable equipment in communication with the cardholder database; (e) receiving the selected promotion data at the merchant screening module including the associated transaction codes and transaction qualifications; (f) transmitting the promotion codes associated with the selected promotion data to the promotion code processing module; and (g) applying at the promotion code processing module the promotion codes to a transaction satisfying the transaction qualifications after the cardholder makes a purchase from the merchant using a payment card over the bankcard network.

After a cardholder selects an available promotion, also known as a promotional program, and a transaction is submitted to the bankcard network, the transaction is interrogated to determine if the transacting merchant and issuer have a relationship that corresponds to a registered program, which covers the transaction. At the merchant screening module, the system determines whether the cardholder has registered for a promotional program. If the cardholder has not registered for a promotional program, the system may bypass the promotion code processing module and continue with the authorization process. If, however, the merchant screening module determines that the cardholder has registered for a promotional program, the system directs the transaction to the promotion code processing module for validation including determining whether the transaction is validated as covered or, conversely, designated as not covered by a registered program. The validation may involve the use of suitable algorithms to apply a specific set of criteria which define the relationship or program. The specific set of criteria may, for example, include transaction parameters such as the merchant type and identity, the cardholder identity, the nature of the transacted goods or services, and the location, time and dollar value of the transaction. Next, at the promotion code processing module, the validated transaction may be flagged if it qualifies for special pricing under the registered program. For the case where the transaction qualifies for special pricing, the merchant accounting system module is configured to calculate the differential between the special pricing for the specific transaction under the program and the standard pricing of a normal bankcard transaction (i.e., which is not covered by the program). The merchant accounting system module is further configured to summarize transaction activity using a number of configurable variables, to report adjustments to the issuer's interchange, to generate payment files to credit or debit merchants' accounts on behalf of the issuer for the differential, and to provide miscellaneous reports to both the issuer and merchants to facilitate reconcilement. The settlement procedures for the standard value of the transaction between the acquirer and issuer are the same or similar to those used in a conventional payment card program as shown in FIG. 1.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a schematic diagram 20 illustrating an exemplary multi-party payment card industry system for enabling ordinary payment-by-card transactions in which the merchants and issuer do not need to have a one-to-one special relationship. The present invention relates to a payment card system, such as a credit card payment system using the MasterCard® interchange network. The MasterCard® interchange network is a set proprietary communications standards promulgated by MasterCard International Incorporated® for the exchange of financial transaction data and settlement funds between financial institutions that are members of MasterCard International Incorporated®. (MasterCard is a registered trademark of MasterCard International Incorporated located in Purchase, New York).

In a typical payment card system, a financial institution called the "issuer" issues a payment card, such as a credit card, to a consumer, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank." When a consumer 22 tenders payment for a purchase with a payment card (also known as a financial transaction card), the merchant 24 requests authorization from the merchant bank 26 for the amount of the purchase. The request may be performed over the telephone, but is usually performed through the use of a point-of-sale terminal, which reads the consumer's account information from the magnetic stripe or chip on the payment card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor" or a "third party processor."

Using the interchange network 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge for a credit transaction is not posted immediately to a consumer's account because bankcard associations, such as MasterCard International Incorporated®, have promulgated rules that do not allow a merchant to charge, or "capture," a transaction until goods are shipped or services are delivered. However, with respect to at least some debit card transactions, a charge may be posted at the time of the transaction. When a merchant ships or delivers the goods or services, the merchant captures the transaction by, for example, appropriate data entry procedures on the point-of-sale terminal. This may include bundling of approved transactions daily for standard retail purchases. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group. More specifically, a transaction is typically settled between the issuer and the interchange network, and then between the interchange network and the merchant bank (also known as the acquirer bank), and then between the merchant bank and the merchant.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
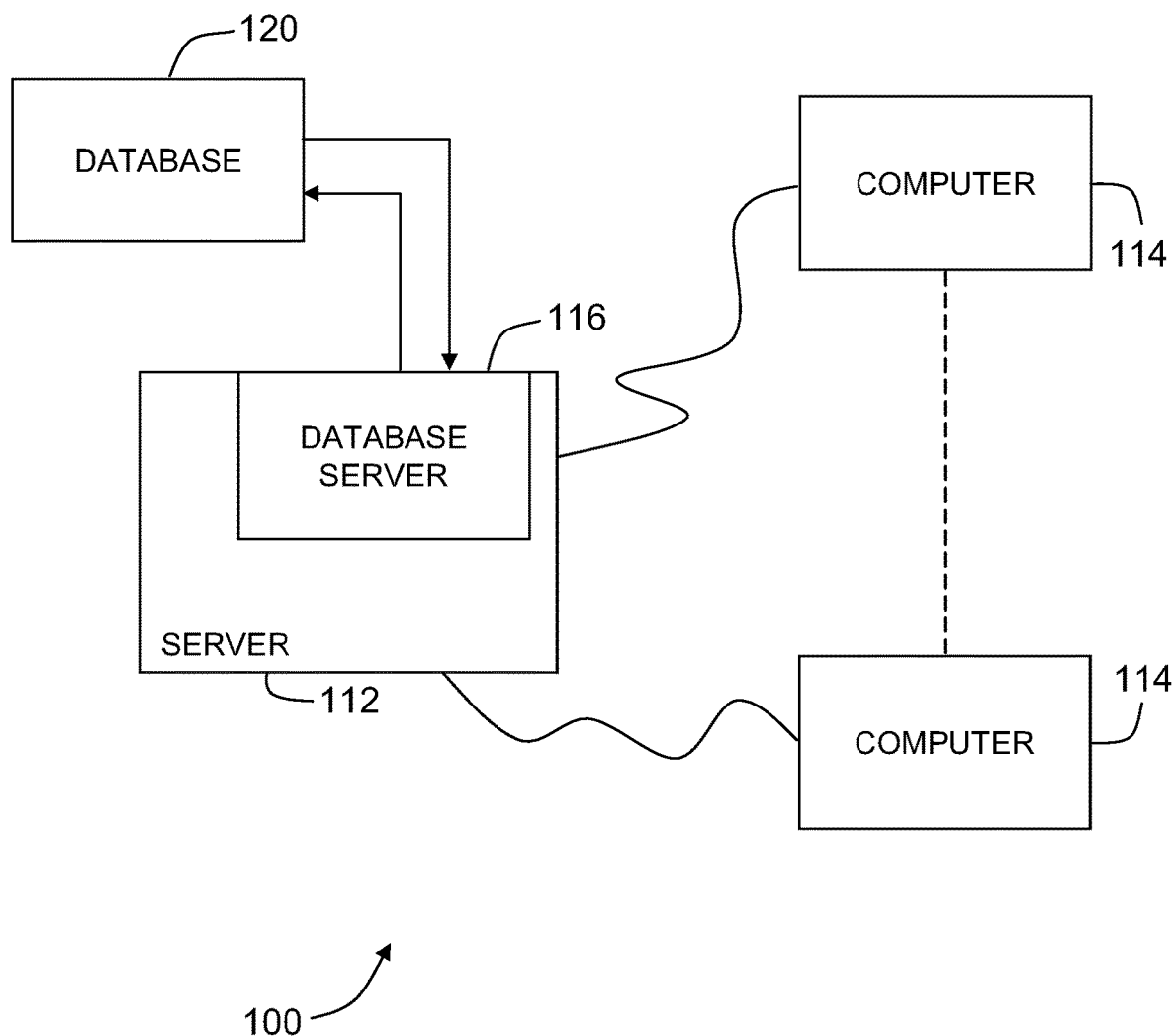
FIG. 2 is a simplified block diagram of an exemplary embodiment of a server architecture of a system in accordance with one embodiment of the present invention.

FIG. 2 is a simplified block diagram of an exemplary system 100 in accordance with one embodiment of the present invention. In one embodiment, system 100 is a payment card system used for implementing special or customized issuer-merchant relationships. In another embodiment, system 100 is a payment card system, which can be utilized by account holders for inputting promotion codes to be applied to payment transactions.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

As discussed below, database 120 stores transaction data generated as part of sales activities conducted over the bankcard network including data relating to merchants, account holders or customers, and purchases. Database 120 further includes data relating to rewards programs and special offers including promotion codes and business rules associated with the different rewards programs and special offers.

Figure 3:
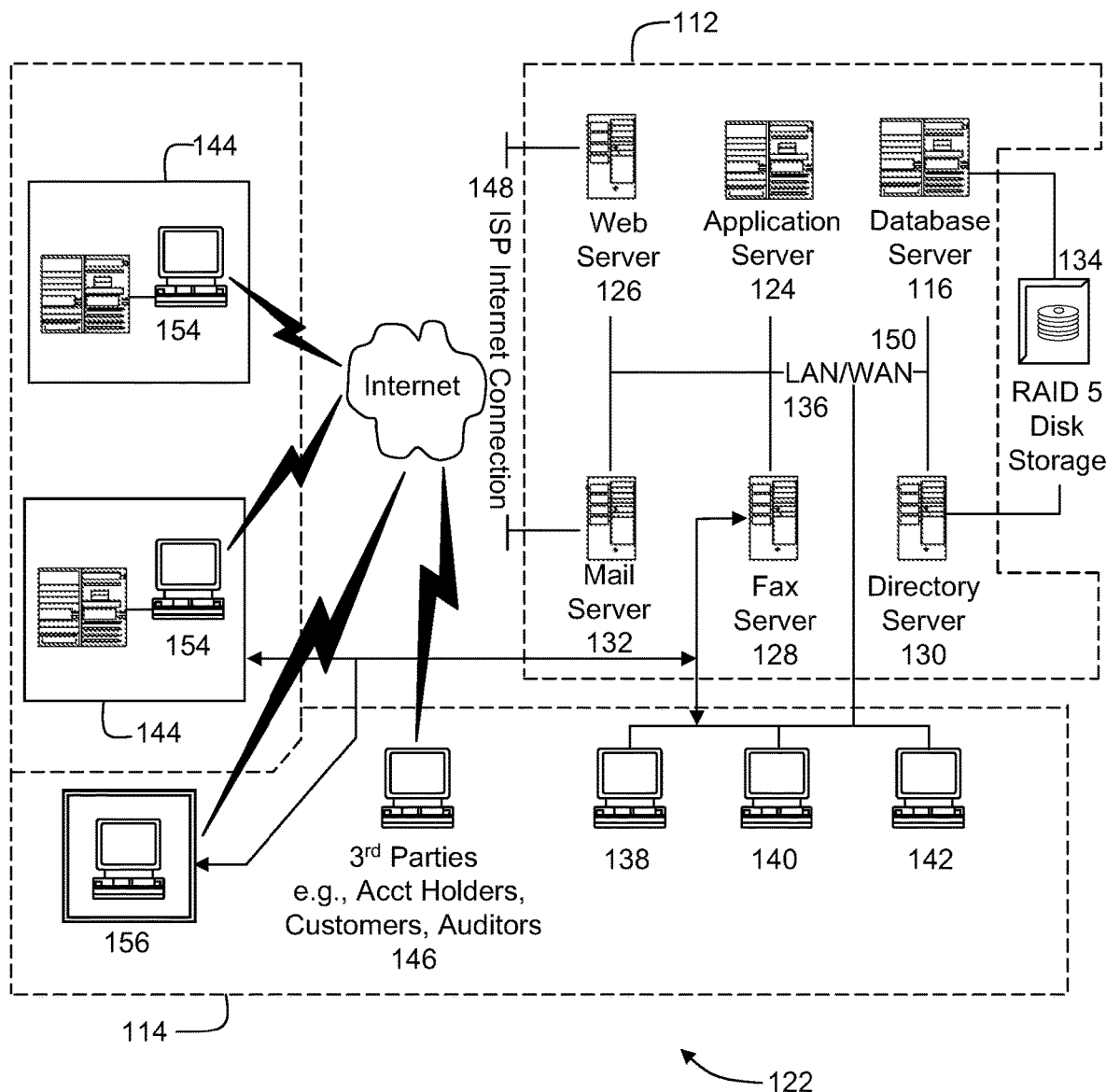
FIG. 3 is an expanded block diagram of an exemplary embodiment of a server architecture of a system in accordance with one embodiment of the present invention.

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
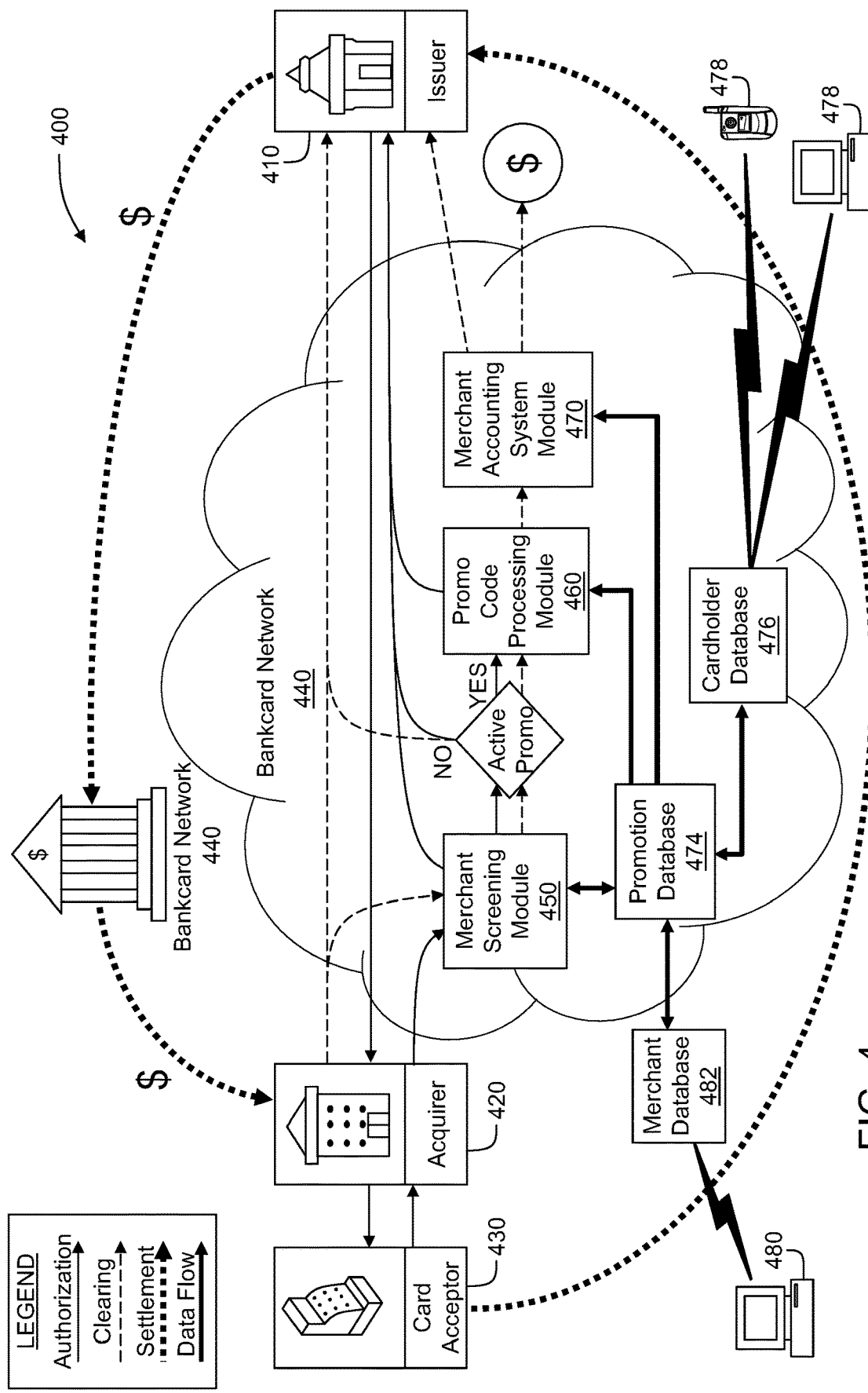
FIG. 4 is schematic diagram illustrating an exemplary process for implementing special or customized issuer-merchant relationships in a payment-by-card system, in accordance with one embodiment of the present invention.

FIG. 4 is schematic diagram 400 illustrating an exemplary process for implementing special or customized issuer-merchant relationships in a payment-by-card system 100 (shown in FIG. 2). System 100 exploits legacy payment-by-card industry infrastructure for implementing a special or customized issuer-merchant relationship. The legacy payment-by-card industry infrastructure includes traditional payment networks (e.g., general purpose bankcard payment network 440), which links entities such as the card issuer or bank (e.g., issuer 410), card acceptors (e.g., merchants 430), and third-party transaction processors (e.g., merchant acquirers 420). System 100 incorporates one or more specific processing modules (e.g., merchant screening module 450, promotion code processing module 460, and merchant accounting system module 470) for processing special relationship transactions in payment network 440.

In addition, system 100 includes promotion database 474, cardholder database 476 and remote devices 478. System 100 may also include merchant computer 480 in communication with merchant database 482. As discussed in more detail in FIG. 9 below, promotion database 474 is in communication with merchant screening module 450, cardholder database 476, merchant database 482, promotion code processing module 460 and merchant accounting system 470. Cardholder database 476 is in communication with remote devices 478. In the example embodiment, merchant screening module 450, promotion code processing module 460, merchant accounting systems module 470, promotion database 474, cardholder database 476, and merchant database 482 are all shown as separate modules or units. In alternative embodiments, the structure and functions of these modules or units can be easily merged in a single module or partitioned into further modules. Furthermore, separate modules may communicate information directly or indirectly through other modules.

Remote devices 478, also known as input devices, include such devices as a personal computer, a cellular telephone, a personal digital assistant (PDA), or other web-based connectable equipment that can be configured to communicate with cardholder database 476. In one embodiment, remote device 478 may include a computer or register located at the merchant or the point of sale (POS), wherein at the time the purchase is made by the cardholder the merchant is prompted to ask the cardholder whether the cardholder would like to select a promotional program being offered by the merchant to the cardholder for the corresponding transaction.

In practice, an issuer 410 who has a special relationship or program with specific merchants registers the program in merchant database 482 through the bankcard network 440 for tracking card transactions and associating features (e.g., benefits such as special pricing) of the program with the card transactions. Card transaction data ("transactions") from various merchant sites 430 may be collected in a conventional manner, for example, by merchant acquirer 420 or other traditional entities who then submit the transaction to network 440 for forwarding to issuer 410. The transactions may be formatted in a conventional manner (e.g., according to any suitable payment industry standards used on network 440). In another embodiment, a merchant, using merchant computer 480, can transmit or upload promotional programs into merchant database 482, which communicates with promotion database 474 such that the various cardholders can access the different programs through cardholder database 476.

In the example embodiment, promotion database 474 receives and stores promotion data from merchants participating in bankcard network 440. The promotion data includes at least one of a merchant name, a merchant identification (ID) number, promotion identifiers, transaction qualifications, terms of promotions and promotion codes. In other words, promotion database 474 stores data describing the different promotions or programs that a merchant registered with bankcard network 440 is offering to cardholders. These promotions may include such programs as 30 days same as cash, 90 days no interest, no payment due for 6 months, or a predetermined percentage (e.g., 10%) off the purchase price of the product or service, etc., to entice the cardholder to make a purchase from the merchant using the payment card.

After bankcard network 440 (e.g., MasterCard®) registers a merchant to participate in system 100 and promotion data is stored in promotion database 474, the promotion data is then communicated and registered within merchant accounting system 470. Merchant accounting system 470 is also referred to as a deferred payment tracking system. The promotion data is also transmitted to cardholder database 476 including a displayable list of available promotions or programs that are being offered to each cardholder.

In the example embodiment, a cardholder accesses cardholder database 476 using a remote input device 478 such that promotion data including the list of available promotions being offered to the cardholder is displayed on remote device 478, or promotion data including the list of available promotions being offered to the cardholder can be requested or are automatically "pushed" from promotion database 476 for display on remote devices 478. Once displayed on remote device 478, the cardholder can then select one or more of the promotions from the list of available promotions. By selecting one of the promotions, the cardholder is then registered within system 100 to receive the terms and conditions being offered as part of the promotion upon making a purchase from the merchant with a payment card over bankcard network 440. In an alternative embodiment, a cardholder can register for a promotion within system 100 after making a purchase from a participating merchant with a payment card over bankcard network 440 provided that the promotion selection is completed prior to the transaction being cleared through the bankcard network.

After a cardholder selects a promotion, the selected promotion data is received at merchant screening module 450 for indicating the merchant has a pending promotional program request. The promotion codes associated with the promotion selected by the cardholder are then transmitted to promotion code processing module 460 such that the transaction corresponding to the selected promotion may be tagged for proper processing. Promotion code processing module 460 is configured to apply the corresponding promotion codes to the cardholder payment transaction when the cardholder makes the purchase from the merchant that corresponds with the selected promotion program. In other words, when the cardholder purchases the product or service associated with the cardholder selected promotion using a payment card over bankcard network 440, promotion code processing module 460 applies the appropriate promotion codes to the cardholder payment transaction such that the selected promotion is applied to the cardholder purchase.

More specifically, after a cardholder selects an available promotion and a transaction is submitted to bankcard network 440, the transaction is interrogated to determine if the transacting merchant and issuer have a relationship that corresponds to a registered program which covers the transaction and if the cardholder has registered for a promotion that covers the transaction. During an authorization, merchant screening module 450 determines whether the cardholder has registered for a promotional program. If the cardholder has not registered for a promotional program, the system may bypass promotion code processing module 460 and continue with the authorization process. If, however, merchant screening module 450 determines that the cardholder has registered for a promotional program, the system directs the transaction to promotion code processing module 460 for validation including determining whether the transaction is validated as covered or, conversely, designated as not covered by a registered program and if covered, may optionally include the promotion code on the authorization request sent to issuer 410. During the clearing process, merchant screening module 450 determines whether the cardholder has registered for a promotional program and if so, forwards the transaction to the promotion code processing module 460 for additional processing, including further processing in the merchant accounting system module 470, as needed. The validation may involve the use of suitable algorithms to apply a specific set of criteria which define the relationship or program. The specific set of criteria may, for example, include transaction parameters such as the merchant type and identity, the cardholder identity, the nature of the transacted goods or services, and the location, time and dollar value of the transaction. Next, at promotion code processing module 460, the validated transaction may be flagged if it qualifies for special pricing under the registered program. For the case where the transaction qualifies for special pricing, merchant accounting system module 470 is configured to calculate the differential between the special pricing for the specific transaction under the program and the standard pricing of a normal bankcard transaction (i.e., which is not covered by the program). Merchant accounting system module 470 is further configured to summarize transaction activity by a number of configurable variables, to report adjustments to the Issuer's interchange, to generate payment files to credit or debit merchants' accounts on behalf of the issuer for the differential, and to provide miscellaneous reports to both the Issuer and merchants to facilitate reconcilement. The settlement procedures between the acquirer and issuer are the same or similar to those used in a conventional payment card program as shown in FIG. 1.

From the issuer's perspective in the context of implementing special relationships, system 100 advantageously eliminates the need to establish connectivity directly with merchants (and/or one or more acquirers) to implement the special relationships. Further, system 100 reduces back office processing requirements on the issuer. System 100 also allows the issuer to independently manage the special relationships with the merchants without third party (e.g., an acquirer) involvement. The issuer can, for example, independently manage proprietary pricing structures directly with merchants without having to go through an acquirer. Further, system 100 allows the issuer to offer pricing plans that are not transaction-based. System 100 allows the issuer to use the same payment network infrastructure to process chargebacks and make adjustments directly with merchants, and to establish rewards programs with specific merchants without requiring any special setup at merchant locations.

From the merchants' perspective, system 100 provides special relationship processing, which is transparent to merchants' acquirers. Further, system 100 improves settlement as all transactions including those associated with the special relationship are settled through the general purpose bankcard process instead of ad hoc systems specific to the special relationships. Merchants also may expect improved pricing from issuers due to infrastructure efficiencies in system 100. System 100 also advantageously provides merchants with the ability to offer reward program incentives to improve sales.

From the merchant acquirers' perspective, system 100 advantageously allows transparent passthrough of the special relationship related processing without imposing any specific coding or setup requirements related to the special relationships on the acquirers. Yet, system 100 advantageously increases bankcard transaction volume by including the special relationship transactions in the acquirers' settlement with issuers.

From the bankcard network's perspective in the context of implementing special relationships, system 100 advantageously establishes special relationships between merchants and cardholders. System 100 may also convert at least some private label transactions into transactions using the payment card associated with the bankcard network. System 100 also creates opportunities for partnerships with cellular telephone companies because system 100 enables cardholders to register for promotion programs using cellular telephones, wherein these cardholder initiated promotion programs are then applied to purchase transactions made by the cardholder from a merchant. System 100 also provides incentive for acquirers and issuers to process transactions through bankcard network 440. System 100 may also generate new revenue streams between merchants and cardholders directly.

Conventional card transaction data processing involves clearing, authorization, chargebacks and adjustments, settlements, and other front or back end processes. During the clearing process, the acquirer provides the appropriate issuer data required to identify the cardholder's account and the dollar amount of the sales. When the issuing bank gets this data, the bank posts the amount of the sale as a draw against the cardholder's available credit and prepares to send payment to the acquirer. Authorization involves the acknowledgment by the issuer that a particular account may be charged for the amount of the sale. In the settlement process, the issuer sends a record of money that is being transferred from its account to that of the acquirer, who then pays the merchant. Funds are settled between issuers and acquirers through selected bank accounts. Chargebacks and adjustments processes relate to a card transaction that is billed back to the merchant after the sale has been settled. More specifically, a transaction is typically settled between the issuer and the interchange network, and then between the interchange network and the merchant bank (also known as the acquirer bank), and then between the merchant bank and the merchant.

The authorization, clearing, chargebacks and adjustments, and settlements processes for card transactions in system 100 are further described in more detail herein with reference to FIGS. 5-8, respectively.

Figure 5:
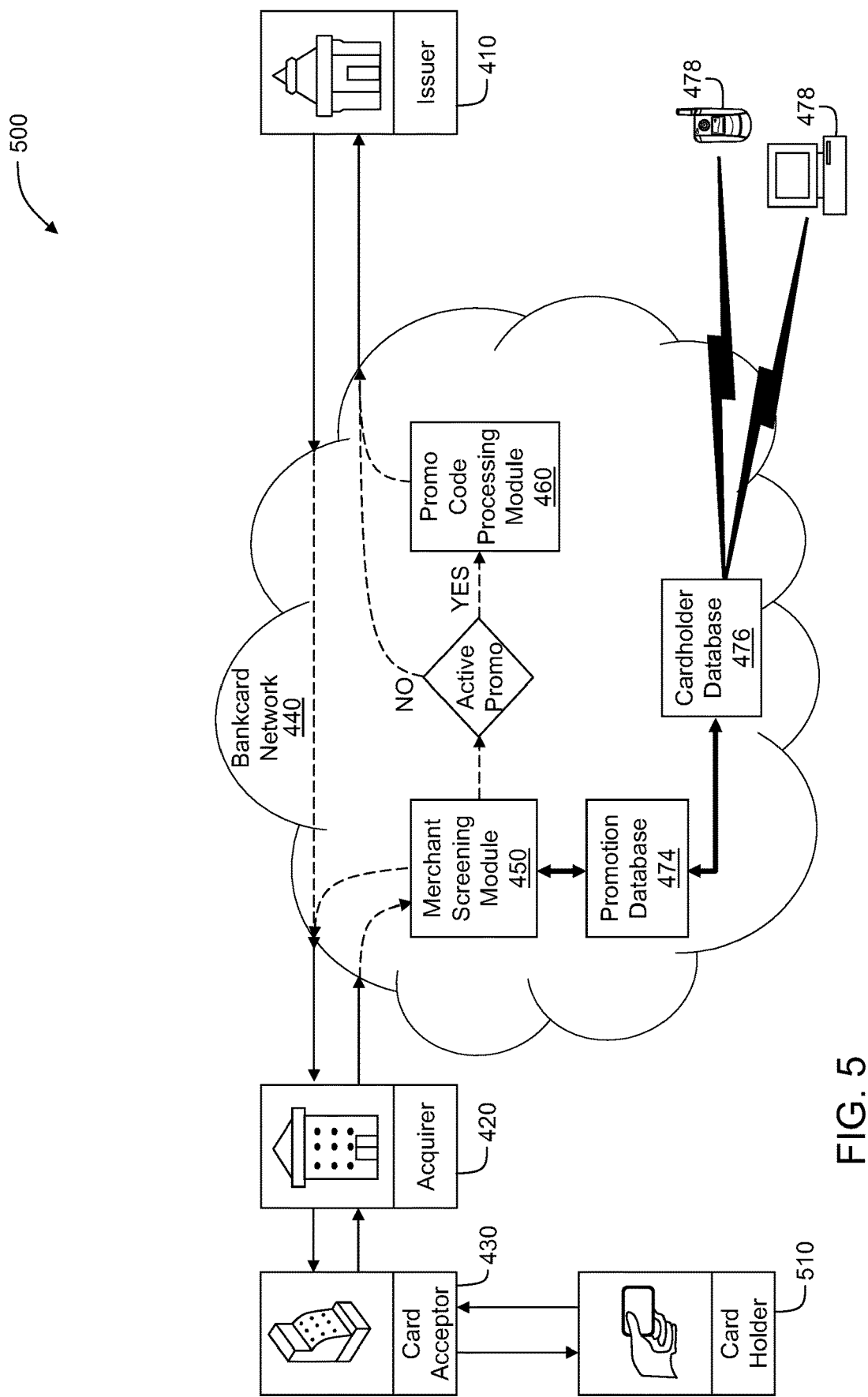
FIG. 5 is a schematic diagram illustrating authorization request process flows in the exemplary process shown in FIG. 4, in accordance with one embodiment of the present invention.

FIG. 5 is a schematic diagram 500 illustrating authorization request process flows in the exemplary process shown in FIG. 4. Components shown in FIGS. 5-8 that are identical to components of diagram 400 (shown in FIG. 4), are identified in FIGS. 5-8 using the same reference numerals as used in FIG. 4. The authorization requests may have the same format as standard general purpose bankcard authorization requests. The authorization request is a result of cardholder 510 using a payment card to complete a transaction with merchant 430. The flow of these authorization requests from merchant 430 via acquirer 420 to network 440 can utilize existing flow paths established for ordinary card transactions. Then, network 440 routes the authorization requests to merchant screening module 450 for verification that the requesting merchants are included in a registered program.

Merchant screening module 450 may be configured to process the authorization requests, for example, to optionally cross-reference merchant IDs, authorize, decline, or pass on the request to issuer 410 systems for further processing. In some embodiments of system 100 (shown in FIG. 2), merchant screening module 450 may be further configured to route a specific card number transaction to different issuer systems depending on specific criteria met by the transaction (e.g., merchant number, dollar amount, etc.). In the case of non-financial rewards transactions, merchant screening module 450 may be configured to capture and store transactions for later submission into a nightly clearing process. Additionally, merchant screening module 450 could be configured to pass a transaction onto module 460 to include the appropriate promotion codes in the authorization request and then communicate with the issuer so that the issuer can make the appropriate decisions for example in the cases of transactions involving installments or lines of credit.

Figure 6:
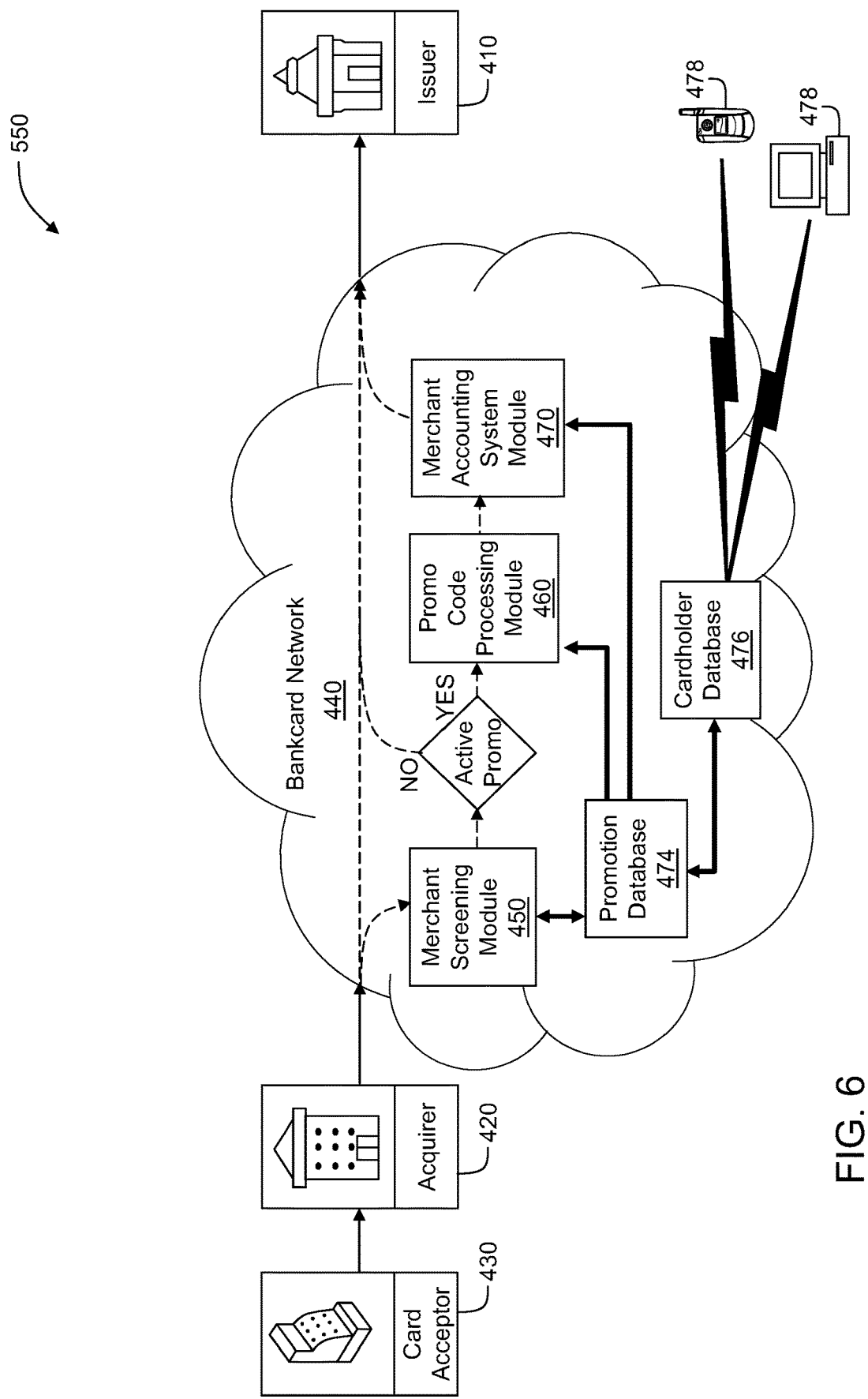
FIG. 6 is a schematic diagram illustrating clearing process flows in the exemplary process shown in FIG. 4, in accordance with one embodiment of the present invention.

FIG. 6 is a schematic diagram 550 illustrating clearing process flows in the exemplary process shown in FIG. 4, in accordance with one embodiment of the present invention. In the example embodiment, payment card transaction data (i.e., clearing records) may have the same format as standard general purpose bankcard clearing records. Like the flow of the authorization requests, the flow of these records from merchant 430 via acquirer 420 to network 440 can utilize existing flow paths and standard interchange rates established for ordinary card transactions (i.e., non-special relationship transactions). Network 440 may route the clearing records to merchant screening module 450 as part of nightly clearing to include the appropriate cross referencing merchant identifications (IDs), and to flag records from merchants not included in the registered programs. Optionally, the merchant screening module 450 may be a secondary process performed outside of the clearing process.

Cardholder database 476 receives data relating to a promotion selected by a cardholder. The promotion data is then received by promotion database 474 from cardholder database 476. Merchant screening module 450 receives the indicator that promotion data is pending from promotion database 474. After merchant screening module 450 determines that the merchant is registered with network 440 and that the transaction is covered by the promotion selected by the cardholder, network 440 then routes the clearing records to promotion code processing module 460 to generate the appropriate codes under registered programs so that the appropriate discount differentials can be calculated for the merchants covered by the programs. Next, network 440 routes the clearing records to the merchant accounting system module 470 to calculate the discount differential for individual clearing records. The discount differential may be based on any number of configurable variables. For example, the discount differential may be based on discount rates, which may be listed in merchant account records available on the network, and on the promotion codes, if any. Further, in the case of a rewards program, merchant accounting system module 470 may be configured to calculate the fees to be charged to the merchant for participation in the rewards program.

Next in the clearing process, merchant accounting system module 470 forwards the clearing records to issuer 410, records transactions and summarizes them by a number of configurable variables to debit or credit differential to merchant accounts, and provides reporting to the merchants and issuer 410.

Figure 7:
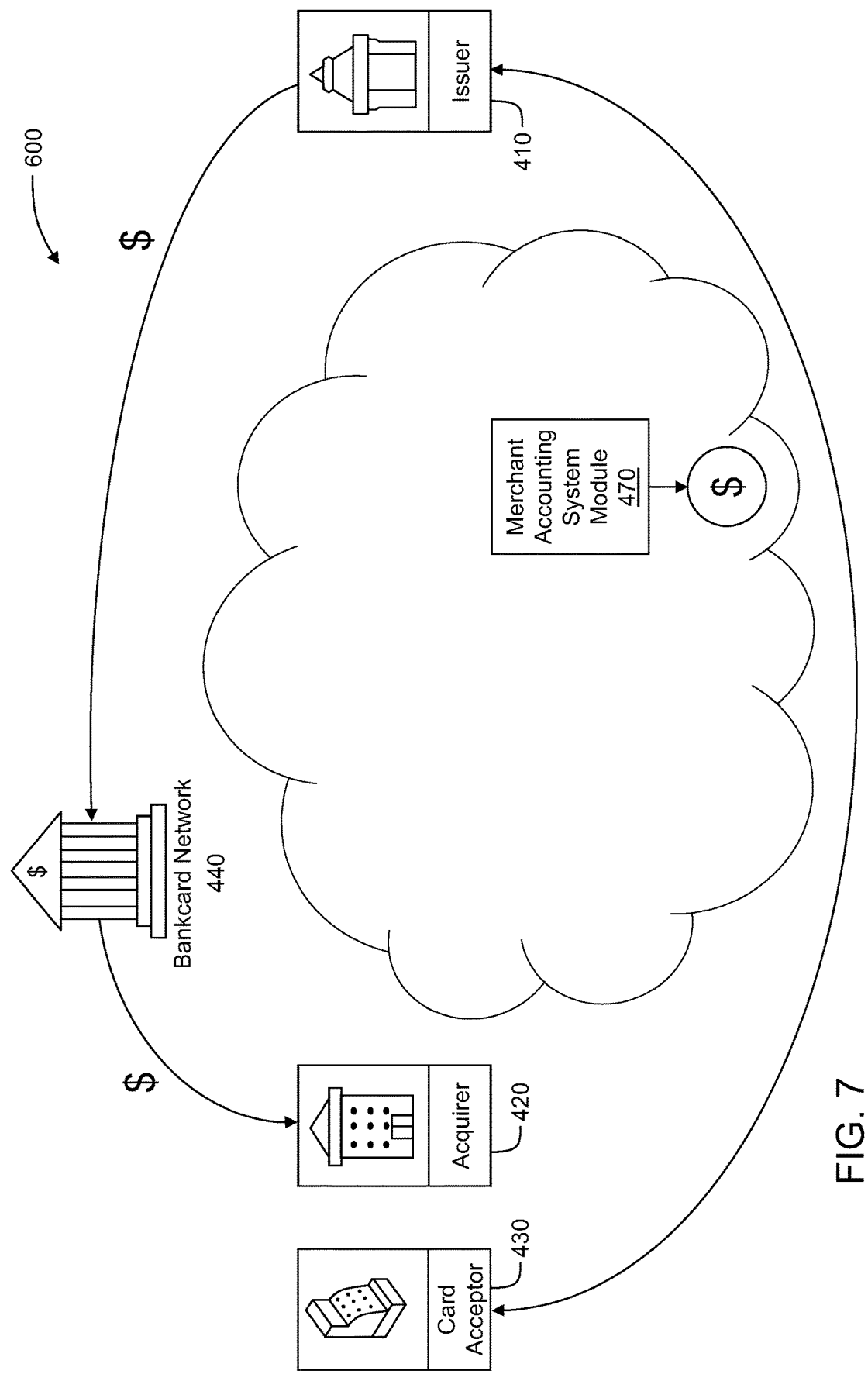
FIG. 7 is a schematic diagram illustrating settlement flows in the exemplary process shown in FIG. 4, in accordance with one embodiment of the present invention.

FIG. 7 is a schematic diagram 600 illustrating settlement flows in the exemplary process shown in FIG. 4, in accordance with one embodiment of the present invention. Bankcard network 440 settles funds with acquirer 420 using standard interchange rates and settlement processes. Similarly, issuer 410 settles funds with bankcard network 440 using standard interchange rates and settlement processes. It is noted that in system 100, merchant accounting system module 470 can create payment files to move debit/credit funds directly between the merchants' and issuer's accounts for the differential amounts or the fees involved in rewards programs or other programs.

Figure 8:
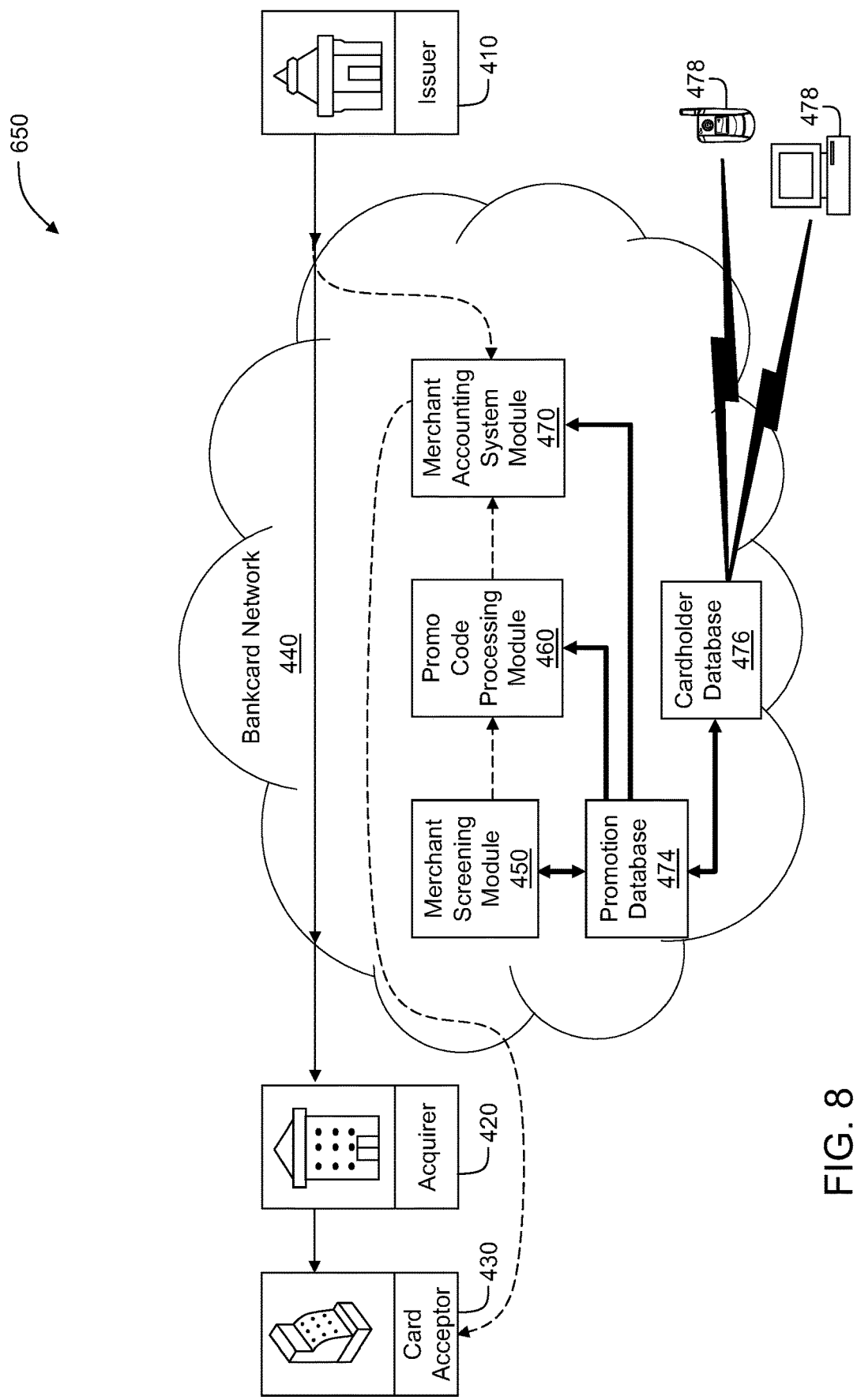
FIG. 8 is a schematic diagram illustrating chargeback and adjustment flows in the exemplary process shown in FIG. 4, in accordance with one embodiment of the present invention.

FIG. 8 is a schematic diagram 650 illustrating chargeback and adjustment flows in the exemplary process shown in FIG. 4, in accordance with one embodiment of the present invention. In system 100, chargebacks and adjustments that conform to standard bankcard policies are processed through existing flow paths with issuer 410 submitting records through the bankcard network 440 to acquirers 420. Similarly, acquirers 420 utilize existing process flow paths back to merchants 430 for chargebacks and adjustments that conform to standard bankcard policies.

However, as shown in FIG. 8, chargebacks and adjustments that have unique properties because of the special relationship between the Issuer 410 and merchants 430 are processed through merchant accounting system module 470. Such chargebacks are processed directly between issuer 410 and merchants 430. The chargebacks can be for an entire amount of the transaction, or strictly for the portion of the chargeback that exceeds standard bankcard policies, as appropriate under specific programs. Similarly, adjustments for any of the special programs are processed directly with the merchant accounts in the same manner, and can be included in the summarized transaction activity used to credit/debit funds and provide reporting.

While the present application describes what are believed to be the preferred embodiments of the present invention, those skilled in the art will recognize that further changes and modifications may be made thereto without departing from the spirit of the invention, and it is intended to claim all such changes and modifications that are within the spirit of the invention. For example, in FIGS. 4-8 and the related description merchant screening module 450, promotion code processing module 460, merchant accounting systems module 470, promotion database 474 and cardholder database 476 are shown as separate modules or units. However, it is readily understood that the structure and functions of these modules can be easily merged in a single module or partitioned into further modules.

It also will be understood that the systems and methods of the present invention can be implemented using any suitable combination of hardware and software. The software (i.e., instructions) for implementing and operating the aforementioned systems and methods can be provided on computer-readable media, which can include without limitation, firmware, memory, storage devices, micro controllers, microprocessors, integrated circuits, ASICS, on-line downloadable media, and other available media.

Figure 9:
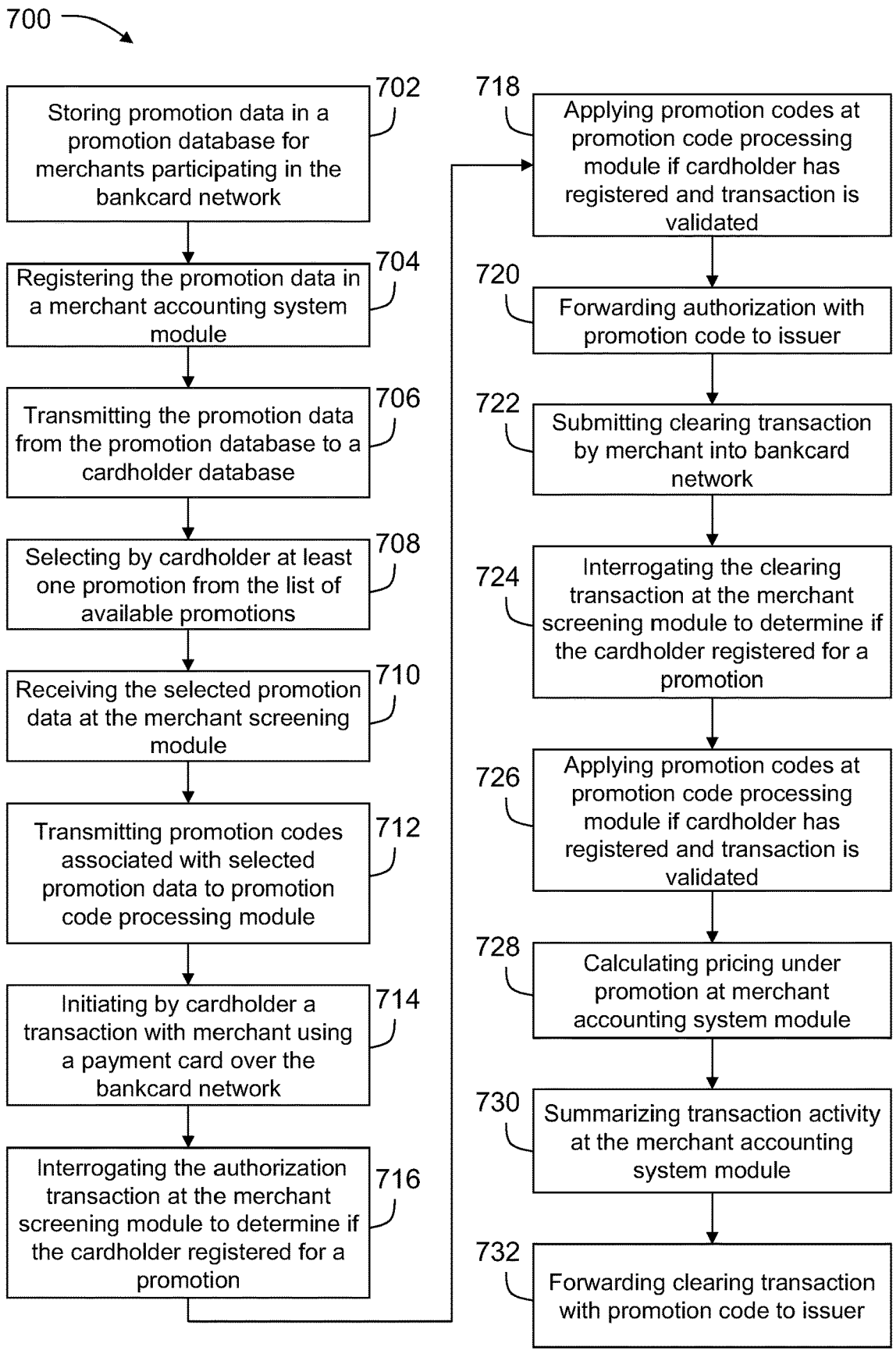
FIG. 9 is a flowchart illustrating exemplary processes utilized by the system shown in FIG. 2, in accordance with one embodiment of the present invention.

FIG. 9 is a flowchart 700 illustrating exemplary processes utilized by system 100 (shown in FIG. 2) for a cardholder to select a promotional program offered by a merchant registered with a bankcard network such that promotion codes associated with the selected promotional program are automatically applied to the cardholder's payment transaction with the merchant.

More specifically, the technical effect of the processes and systems described herein is achieved by storing 702 promotion data in a promotion database for merchants participating in the bankcard network including a merchant name, a merchant identification (ID) number, promotion identifiers, transaction qualifications, terms of promotions and promotion codes. In one embodiment, the promotion data is communicated to the promotion database using a merchant computer. After the promotion data is stored in the promotion database, the system registers 704 the promotion data in the merchant accounting system module, and transmits 706 the promotion data from the promotion database to a cardholder database. The cardholder database is accessible by a plurality of cardholders using remote input devices such a person computer, PDA, cellular phone or a point of sale device at the merchant. The promotion data stored in the promotion database includes a displayable list of available promotions for each cardholder. The cardholder then selects 708 at least one promotion from the list of available promotions using an input device. The selected promotion data is communicated from the cardholder database to the merchant screening module. After receiving 710 the selected promotion data at the merchant screening module including the associated transaction codes and transaction qualifications, the promotion codes associated with the selected promotion data are transmitted 712 to the promotion code processing module for application to a payment transaction satisfying the transaction qualifications.

In the example embodiment, after a cardholder selects an available promotion, the cardholder then performs 714 a transaction (i.e., purchases a good or service) with the merchant using a payment card over the bankcard network, wherein the transaction satisfies the transaction qualifications of the selected promotion. The authorization for the transaction is interrogated 716 at the merchant screening module to determine if the transacting merchant and issuer have a relationship that corresponds to a registered program which covers the transaction and if the cardholder has registered for a promotion that covers the transaction. At the merchant screening module, the system determines whether the cardholder has registered for a promotional program. If the cardholder has not registered for a promotional program, the system may bypass the promotion code processing module and continue with the authorization process. If, however, the merchant screening module determines that the cardholder has registered for a promotional program, the system directs the transaction to the promotion code processing module for validation including determining whether the transaction is validated as covered or, conversely, designated as not covered by a registered program and if covered, may optionally apply 718 the promotion code on the authorization request forwarded 720 to the issuer. The validation may involve the use of suitable algorithms to apply a specific set of criteria which define the relationship or program. The specific set of criteria may, for example, include transaction parameters such as the merchant type and identity, the cardholder identity, the nature of the transacted goods or services, and the location, time and dollar value of the transaction.

During the clearing process, the clearing for the transaction is submitted 722 by the merchant into the bankcard network. The clearing for the transaction is interrogated 724 at the merchant screening module to determine if the cardholder has registered for a promotional program. If so, the merchant screening module forwards the transaction to the promotion code processing module for additional processing, including applying 726 promotion codes and further processing in the merchant accounting system module.

When the promotion code processing module applies the promotion codes associated with the cardholder selected promotion to the transaction, the selected promotion is applied to the cardholder purchase transaction. For the case where the transaction qualifies for special pricing, merchant accounting system module calculates 728 the differential between the special pricing for the specific transaction under the program and the standard pricing of a normal bankcard transaction (i.e., which is not covered by the program). The merchant accounting system module also summarizes 730 transaction activity by a number of configurable variables, to report adjustments to the issuer's interchange, to generate payment files to credit or debit merchants' accounts on behalf of the issuer for the differential, and to provide miscellaneous reports to both the issuer and merchants to facilitate reconcilement. The system also forwards 732 the clearing for the transaction with promotion codes to the issuer.

While the invention has been described in terms of various specific embodiments, those skilled in the art will recognize that the invention can be practiced with modification within the spirit and scope of the claims.

What is claimed is:

1. A method implemented by a payment card network for applying a promotional program to a payment card transaction, the payment card transaction including a purchase made by a cardholder from a card acceptor using a payment card over the payment card network, said method implemented on at least one server coupled to a database, the at least one server including at least one legacy transaction processing module, a database interface module, a merchant screening module, a promotion code processing module, and a merchant accounting system module, said method comprising the steps of:

storing, in the database, promotion data including (i) a plurality of promotional programs offered by at least one merchant participating in the payment card network and (ii) promotion codes corresponding to each of the plurality of promotional programs;

receiving, at the database interface module from a cardholder-controlled computing device, an input identifying a selected one of the promotional programs;

transmitting, from the database interface module to the merchant screening module in response to the received input, a registration of an account of the cardholder for the selected promotional program;

transmitting, from the database interface module to the promotion code processing module, the promotion codes corresponding to the selected promotional program;

receiving, by the at least one legacy transaction processing module subsequent to receiving the input identifying the selected promotional program, an authorization request for the payment card transaction, the authorization request formatted according to payment card industry standards and including transaction data, the transaction data including a merchant identifier associated with the card acceptor and a transaction amount of the payment card transaction;

routing, by the at least one legacy transaction processing module, the authorization request to the merchant screening module;

determining, by the merchant screening module, that the authorization request corresponds to the registration;

routing, in response to the determination that the authorization request corresponds to the registration, the authorization request to the promotion code processing module;

validating, by the promotion code processing module, that the transaction data qualifies for the selected promotional program;

routing, by the promotion code processing module, the authorization request to an issuer computing device associated with an issuer of the payment card;

receiving, by the at least one legacy transaction processing module from the issuer computing device, an authorization response from the issuer, the authorization response indicating that the account of the cardholder is in good standing and covers the transaction amount;

routing, by the at least one legacy transaction processing module, the authorization response to a merchant computing device;

receiving, by the at least one legacy transaction processing module subsequent to the authorization of the payment card transaction, a clearing record from the merchant computing device, the clearing record formatted according to payment card industry standards and including at least a portion of the transaction data;

routing, by the at least one legacy transaction processing module, the clearing record to the merchant screening module;

determining, by the merchant screening module, that the clearing record corresponds to the registration;

routing, in response to the determination that the clearing record corresponds to the registration, the clearing record to the promotion code processing module;

applying, by the promotion code processing module, the promotion codes associated with the selected promotional program to at least the portion of the transaction data, wherein the application of the promotion codes results in a special price for the payment card transaction;

routing, subsequent to the application of the promotion codes, the clearing record to the merchant accounting system module;

calculating, by the merchant accounting system module, a differential between the transaction amount and the special price;

generating, by the merchant accounting system module, payment files configured to debit or credit funds corresponding to the differential directly between an account of the card acceptor and an account of the issuer; and settling, by the at least one legacy transaction processing module, the transaction amount between an acquiring bank of the card acceptor and the issuer.

2. The method according to claim 1, wherein storing the promotion data further comprises storing, for each promotional program, at least one of a merchant name, a merchant identification (ID) number, a promotion identifier, a transaction qualification, and terms of the promotion.

3. The method according to claim 1, wherein receiving the input identifying the selected one of the promotional programs further comprises:
   pushing promotion data from the database interface module to the cardholder-controlled computing device, causing the cardholder-controlled computing device to display a list of at least one available promotional program being offered by the at least one merchant to the cardholder; and
   receiving the input as a selection by the cardholder from the displayed list.

4. The method according to claim 1, wherein validating that the transaction data qualifies for the selected promotional program comprises comparing, by the promotion code processing module, at least one of a merchant type, a merchant identity, a cardholder identity, a category of the transacted goods or services, a location of the transaction, a time of the transaction, and the transaction amount to the promotion data.

5. A method implemented by a payment card network for applying a promotional program to a payment card transaction, the payment card transaction including a purchase made by a cardholder from a card acceptor using a payment card over the payment card network, said method implemented on at least one server coupled to a database, the at least one server including at least one legacy transaction processing module, a merchant screening module, a promotion code processing module, and a merchant accounting system module, said method comprising the steps of:
   storing, in the database, promotion data including (i) a plurality of promotional programs offered by at least one merchant participating in the payment card network and (ii) promotion codes corresponding to each of the plurality of promotional programs;
   receiving, at the merchant screening module, a registration of an account of the cardholder for a selected one of the promotional programs;
   receiving, at the promotion code processing module, the promotion codes corresponding to the selected promotional program;
   processing, by the at least one legacy transaction processing module subsequent to receiving the registration, an authorization request for the payment card transaction, the authorization request formatted according to payment card industry standards and including transaction data, the transaction data including a merchant identifier associated with the card acceptor and a transaction amount of the payment card transaction;
   routing, by the at least one legacy transaction processing module, an authorization response to a merchant computing device, the authorization response indicating that an issuer computing device associated with an issuer of the payment card has determined that the account of the cardholder is in good standing and covers the transaction amount;
   receiving, by the at least one legacy transaction processing module subsequent to the authorization of the payment card transaction, a clearing record from the merchant computing device, the clearing record formatted according to payment card industry standards and including at least a portion of the transaction data;
   routing, by the at least one legacy transaction processing module, the clearing record to the merchant screening module;
   determining, by the merchant screening module, that the clearing record corresponds to the registration;
   routing, in response to the determination that the clearing record corresponds to the registration, the clearing record to the promotion code processing module;
   applying, by the promotion code processing module, the promotion codes associated with the selected promotional program to at least the portion of the transaction data, wherein the application of the promotion codes results in a special price for the payment card transaction;
   routing, subsequent to the application of the promotion codes, the clearing record to the merchant accounting system module;
   calculating, by the merchant accounting system module, a differential between the transaction amount and the special price;
   generating, by the merchant accounting system module, payment files configured to debit or credit funds corresponding to the differential directly between an account of the card acceptor and an account of the issuer; and
   settling, by the at least one legacy transaction processing module, the transaction amount between an acquiring bank of the card acceptor and the issuer.

6. The method according to claim 5, wherein storing the promotion data further comprises storing, for each promotional program, at least one of a merchant name, a merchant identification (ID) number, a promotion identifier, a transaction qualification, and terms of the promotion.

7. The method according to claim 5, wherein receiving the registration comprises receiving, at a database interface module of the at least one server from a cardholder-controlled computing device, an input identifying a selected one of the promotional programs.

8. The method according to claim 7, wherein receiving the input identifying the selected one of the promotional programs further comprises:
   pushing promotion data from the database interface module to the cardholder-controlled computing device, causing the cardholder-controlled computing device to display a list of at least one available promotional program being offered by the at least one merchant to the cardholder; and
   receiving the input as a selection by the cardholder from the displayed list.

9. The method according to claim 5, further comprising:
   routing, by the at least one legacy transaction processing module, the authorization request to the merchant screening module; and
   determining, by the merchant screening module, that the authorization request corresponds to the registration.

10. The method according to claim 9, further comprising validating, by the promotion code processing module, that the transaction data qualifies for the selected promotional program.

11. The method according to claim 10, wherein validating that the transaction data qualifies for the selected promotional program comprises comparing, by the promotion code processing module, at least one of a merchant type, a merchant identity, a cardholder identity, a category of the transacted goods or services, a location of the transaction, a time of the transaction, and the transaction amount to the promotion data.

12. The method according to claim 5, further comprising:
   calculating, by the merchant accounting system module, a fee to be charged to the card acceptor for participation in the promotional program; and generating, by the merchant accounting system module, the payment files further configured to debit or credit funds corresponding to the fee directly between the account of the card acceptor and the account of the issuer.

13. A network-based system for applying a promotional program to a payment card transaction, the payment card transaction including a purchase made by a cardholder using a payment card over a payment card network, the payment card transaction including a purchase made by a cardholder from a card acceptor using a payment card over the payment card network, said system comprising:
   a database for storing information; and
   at least one server coupled to said database and including at least one legacy transaction processing module, a merchant screening module, a promotion code processing module, and a merchant accounting system module, said server system further configured to:
      store, in the database, promotion data including (i) a plurality of promotional programs offered by at least one merchant participating in the payment card network and (ii) promotion codes corresponding to each of the plurality of promotional programs;
      receive, at the merchant screening module, a registration of an account of the cardholder for a selected one of the promotional programs;
      receive, at the promotion code processing module, the promotion codes corresponding to the selected promotional program;
      process, by the at least one legacy transaction processing module subsequent to receiving the registration, an authorization request for the payment card transaction, the authorization request formatted according to payment card industry standards and including transaction data, the transaction data including a merchant identifier associated with the card acceptor and a transaction amount of the payment card transaction;
      route, by the at least one legacy transaction processing module, an authorization response to a merchant computing device, the authorization response indicating that an issuer computing device associated with an issuer of the payment card has determined that the account of the cardholder is in good standing and covers the transaction amount;
      receive, by the at least one legacy transaction processing module subsequent to the authorization of the payment card transaction, a clearing record from the merchant computing device, the clearing record formatted according to payment card industry standards and including at least a portion of the transaction data;
      route, by the at least one legacy transaction processing module, the clearing record to the merchant screening module;
      determine, by the merchant screening module, that the clearing record corresponds to the registration;
      route, in response to the determination that the clearing record corresponds to the registration, the clearing record to the promotion code processing module;
      apply, by the promotion code processing module, the promotion codes associated with the selected promotional program to at least the portion of the transaction data, wherein the application of the promotion codes results in a special price for the payment card transaction;
      route, subsequent to the application of the promotion codes, the clearing record to the merchant accounting system module;
      calculate, by the merchant accounting system module, a differential between the transaction amount and the special price;
      generate, by the merchant accounting system module, payment files configured to debit or credit funds corresponding to the differential directly between an account of the card acceptor and an account of the issuer; and
      settle, by the at least one legacy transaction processing module, the transaction amount between an acquiring bank of the card acceptor and the issuer.

14. The system according to claim 13 wherein the at least one server is further configured to store the promotion data including, for each promotional program, at least one of a merchant name, a merchant identification (ID) number, a promotion identifier, a transaction qualification, and terms of the promotion.

15. The system according to claim 13, wherein the at least one server is further configured to receive the registration at a database interface module of the at least one server from a cardholder-controlled computing device, the registration including an input identifying a selected one of the promotional programs.

16. The system according to claim 15, wherein the at least one server is further configured to:
   push promotion data from the database interface module to the cardholder-controlled computing device, causing the cardholder-controlled computing device to display a list of at least one available promotional program being offered by the at least one merchant to the cardholder; and
   receive the input as a selection by the cardholder from the displayed list.

17. The system according to claim 13, wherein the at least one server is further configured to:
   route, by the at least one legacy transaction processing module, the authorization request to the merchant screening module; and
   determine, by the merchant screening module, that the authorization request corresponds to the registration.

18. The system according to claim 17, wherein the at least one server is further configured to validate, by the promotion code processing module, that the transaction data qualifies for the selected promotional program.

19. The system according to claim 18, wherein the at least one server is further configured to validate that the transaction data qualifies for the selected promotional program by comparing, by the promotion code processing module, at least one of a merchant type, a merchant identity, a cardholder identity, a category of the transacted goods or services, a location of the transaction, a time of the transaction, and the transaction amount to the promotion data.

20. The system according to claim 13, wherein the at least one server is further configured to:
   calculate, by the merchant accounting system module, a fee to be charged to the card acceptor for participation in the promotional program; and
   generate, by the merchant accounting system module, the payment files further configured to debit or credit funds corresponding to the fee directly between the account of the card acceptor and the account of the issuer.

* * * * *